United States Patent Office 2,708,665
Patented May 17, 1955

2,708,665

PREPARATION OF VINYL BENZAL ACETOPHENONE POLYMERS

Cornelius C. Unruh, Rochester, N. Y., assignor to Eastman Kodak Company, Rochester, N. Y., a corporation of New Jersey No Drawing. Application September 13, 1951, Serial No. 246,514

5 Claims. (Cl. 260—93.5)

This invention relates to the preparation of polymers of vinyl benzal acetophenone and more particularly to solvent-soluble and light-sensitive polymers thereof.

In the Allen et al. U. S. patent application, Serial No. 771,142, filed August 28, 1947, now U. S. Patent No. 2,566,302, granted September 4, 1951, are described light-sensitive polymers made by the acylation of a polymer such as polystyrene with cinnamoyl chloride. Since acylation apparently proceeds to a limited extent before insolubilization occurs, a copolymer is obtained, for example,

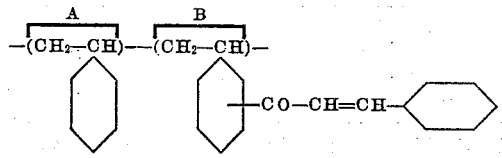

By this method polymers are obtained of good light sensitivity and solubility when the molecular proportions of units A to B are from 5:1 to 18:1 (from about 5 to 16 mol percent of vinyl benzal acetophenone groups).

I have discovered that if suitable reaction conditions are employed in acylating a styrene polymer with a cinnamoyl halide, solvent-soluble light-sensitive vinyl benzal acetophenone polymers are obtained which are much more light sensitive in spite of the fact that they contain substantially fewer of the active benzal acetophenone groups.

Presumably these improved characteristics are due to the fact that my process is capable of incorporating a number of groups into resin molecules without causing substantial number of cross-linkages to be formed between the polymeric chains of atoms. That is, my process readily produces polymers containing only about 2.0 to 5.4 mol percent of combined vinyl benzal acetophenone groups, yet these polymers have speeds to light of the order of 60 to 150. On the same speed scale, the Allen et al. polymers possess speeds of only about 1 to 2.

A possible explanation for the fact that my resins are more soluble and light-sensitive than those produced by the Allen et al. invention, lies in the belief that by observing careful temperature control, thorough agitation during the reaction and avoidance of large excesses of the Friedel-Crafts catalyst aluminum chloride, fewer cross-linkages are introduced into the polymer molecule. In the mentioned invention about a 100 percent excess of aluminum chloride based on the cinnamoyl chloride present is used, whereas I use only about 0.1 mol excess of aluminum chloride which may go far to account for the substantial improvement in physical properties of the polymers of my invention.

The light sensitivity of the polymers is determined by exposure of a layer of the polymer coated on a hydrophilic surface under a photographic continuous tone step tablet to insolubilize the polymer in the exposed regions. After exposure, the least exposed areas are removed with a solvent for the polymer, such as methyl ethyl ketone. The sensitometric characteristics of the undissolved polymer remaining on the surface in the form of a step tablet are then recorded by well-known photographic methods. From these values a speed value is assigned to the particular polymer under test.

I prepare the polymers of the invention by acylating a polymer of a compound having the general formula

wherein D represents an aryl group of the benzene series, substituted or not as below, under substantially anhydrous conditions in carbon disulfide solution in the presence of at least one-half mol of the cinnamoyl chloride per mol (monomeric unit) of the polymer and about 0.1 molar excess of anhydrous aluminum chloride based on the amount of cinnamoyl chloride used. At all times and until reaction is complete, the reaction mixture is stirred well and maintained at a temperature of about 5 to 15° C., preferably 10 to 12° C.

The styrene polymers which can be acylated according to my invention are those such as disclosed in the Allen et al. invention, particularly polystyrene, o- and m-methoxy styrenes, o-chloro-, m-chloro-, p-chloro- or bromo-, p-benzyl-, p-phenoxy-, 2,5-dimethyl-, 3,4-dichloro-, 3,4-dimethoxy- styrenes, and copolymers thereof with, for example styrene, p-chloro styrene, etc., acrylonitrile, and the like. Typical copolymers are as follows: styrene-isobutylene, styrene-vinyl acetophenone (a copolymer of styrene and vinyl acetophenone which is to be cinnamoylated then the acetyl groups may be condensed with an aldehyde) etc. The cinnamoyl halides useful in the process of my invention include, in addition to cinnamoyl chloride, the isomeric mononitro cinnamoyl halides, the isomeric monohalogen nuclear substituted cinnamoyl halides, the isomeric mono methyl cinnamoyl halides, o-methoxy cinnamoyl halides, e. g. o-nitro-, o-chloro-, p-chloro-, o-methyl-, m-methyl- and o-methoxy cinnamoyl chlorides and mixtures thereof.

The resulting polymers thus contain units having the following general formula

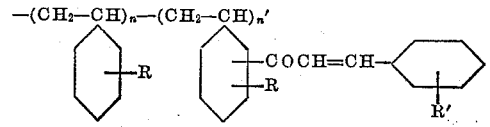

wherein R is H or the nuclear substituent of the styrenes indicated above and R' is H or the nuclear substituent of the cinnamoyl halides indicated above. $n$ and $n'$ are positive integers preferably such that the ratio $n'/n+n'$ is of the order of from $4/100$ to $6/100$ i. e., the mol percent of the vinyl benzalacetophenone units is from about 4 to 6. The polymers can of course contain other units such as isobutylene when the polymer which is acylated is a copolymer of a styrene.

As mentioned, I use at least one-half mol of the cinnamoyl chloride per mol of styrene units in the styrene polymer molecule, particularly one-half mol and one mol of cinnamoyl chloride per styrene unit as shown in the following examples. It is to be noted that when these proportions were utilized in the Allen et al. invention, products of limited solubility were obtained, whereas my polymers possess good solubility in solvents, particularly dioxane, methyl ethyl ketone, chlorobenzene, chloroform, etc.

The following examples are given as illustrative of the methods I employ to prepare the solvent-soluble light-sensitive polymers of the invention. Example 1 is provided to show the effect on the structure and light sensitivity of a polymer when using too much aluminum chloride in the reaction mixture.

Example 1

26 grams of polystyrene were dissolved in 260 grams of carbon disulfide and the mixture cooled by immersing the container in running tap water. To this was added a solution of 2.3 grams of cinnamoyl chloride in 60 grams of carbon disulfide. While keeping this mixture cool by means of a bath of running water at a temperature of 10 to 12° C., there was added in small portions over a period of 45 minutes, 3.4 grams of anhydrous aluminum chloride with good stirring. After the addition was complete, the stirring was continued for one hour, the mixture being kept cold during this interval. The orange-colored mixture was then allowed to stand overnight (16 hours), during which interval the temperature gradually rose to that of the room (75° F.). Thereafter the mixture was gently warmed on a steam bath and a mixture of ice and a small amount of hydrochloric acid was then added with stirring. The mixture was then steamed to remove the bulk of the carbon disulfide. The friable pink-colored product was then dried at 40° C., dissolved in 300 cc. of dioxane and the solution precipitated in a large excess of ethyl alcohol. After leaching in a further quantity of ethyl alcohol and drying, the yield was 25 grams. The product was further purified by dissolving in dioxane and precipitating into ethyl alcohol. The product showed a vinyl benzal acetophenone content of 1.13 mol percent when analyzed by means of infrared absorption methods.

The critical nature of the above process was demonstrated by increasing the amounts of all of the ingredients above by a factor of 10. In this case, an insoluble gel was formed when the reaction mixture was allowed to stand overnight and the isolated polymer would not dissolve in those solvents found to give true solutions of the product made on a smaller scale as described above. I have reasoned that inadequate temperature control causes this result and it was subsequently borne out by a third process on the larger scale in which the temperature of the reaction mixture was maintained at 8 to 10° C. and stirring was employed at all times throughout the reaction period. The resultant product was solvent-soluble although possessing very low light sensitivity because a relatively small amount of cinnamoyl chloride was utilized.

The characteristics of a resin prepared by this method are tabulated in the following table as Example 1.

*Example 2*

This example shows the effect of using my improved technique of employing only about 0.1 mol excess of aluminum chloride catalyst but still using less than one-half mol cinnamoyl chloride per mol of styrene resin with the result that light sensitivity is still very low although solubility of the polymer is good.

A solution of 26 grams of polystyrene in 260 grams of carbon disulfide was placed in a reaction vessel fitted with a condenser, efficient stirrer, and thermometer, the flask being cooled by running water. To this mixture was added a solution of 8.3 grams (representing ⅓ molar equivalent) of cinnamoyl chloride in 40 grams of carbon bisulfide and while being stirred a further 200 grams of carbon disulfide was added, giving a solution of approximately 5% by weight of polystyrene which is advantageous since reaction in dilute solution also tends to minimize cross-linking. While maintaining this solution well stirred and the temperature at 8–10° C., there was added a total of 7.3 grams of anhydrous aluminum chloride in small portions over a period of about one hour. The stirring was continued after addition was complete for a period of 24 hours, the temperature being maintained at 8–10° C. during this interval.

The product was a deep orange colored viscous mass which was then gently warmed until the carbon bisulfide began to boil, whereupon an excess of cracked ice was added and well stirred. About 25–50 cc. of concentrated hydrochloric acid were also added to the mixture and the product well stirred for 20–30 minutes. Steam was then blown into this mixture and the excess carbon bisulfide thereby evaporated. The soft, pink cake, on cooling, became friable. This was broken up, rinsed with cold water and dried at 40° C. The crude polymer was dissolved in methyl ethyl ketone and the solution filtered. The filtrate was poured in a thin stream into an excess of well stirred ethyl alcohol to give a white, fibrous polymer. This was leached in fresh ethyl alcohol, pressed out and dried. Analytical samples were redissolved in methyl ethyl ketone and reprecipitated in ethyl alcohol and dried. The characteristics of the polymer thus obtained are shown in the following table as Example 2.

*Examples 3, 4 and 5*

These procedures involve the use of from one-half to one mol of cinnamoyl chloride per mol of styrene resin and otherwise were conducted under conditions identical to those of Example 2, in all cases maintaining the aluminum chloride ratio at about 1.1 mol per mol of cinnamoyl chloride used. The table following shows as Examples 3, 4 and 5, the proportions of reactants used and the properties of the resulting polymers.

All polymers possessed good solubility in the mentioned organic solvents.

| Ex. | Poly-styrene (gms.) | CS₂ (gms.) | Cinnamoyl Chloride, gms. (Mol. Equiv.) | AlCl₃ (gms.) | Reaction Time (hrs.) | Mol. percent Benzal Ketone | Speed |
|---|---|---|---|---|---|---|---|
| 1 | 26 | 320 | 2.3 (1/18) | 3.4 | 15 | 1.13 | 1.4 |
| 2 | 26 | 500 | 8.3 (1/5) | 7.3 | 24 | 2.18 | 5 |
| 3 | 26 | 500 | 20.8 (1/2) | 18.3 | 24 | 3.91 | 100 |
| 4 | 26 | 500 | 42 (1/1) | 37 | 24 | 4.58 | 60 |
| 5 | 26 | 500 | 42 (1/1) | 37 | 48 | 5.4 | 150 |

The vinyl benzal acetophenone content of the polymers was obtained by measuring the infrared absorption of the polymers in carbon disulfide solution in a spectrophotometer at wave lengths 6.03, 7.53, 8.27 and 9.85 micron using as a standard the absorption of benzal acetophenone.

The nuclear substituted styrene polymers can be reacted with a cinnamoyl halide in the manner of Examples 3, 4 and 5, to obtain the corresponding vinyl benzal acetophenone polymers.

The polymers of the invention are particularly useful for photomechanical purposes where it is desired to prepare a resist image on a given surface. For example, the polymer can be coated from solvent upon a support such as a metal plate, paper or organic colloid surface, for example, a surface repelling greasy printing inks when wetted with fountain solutions, such as a lithographic paper plate, and after exposure to the desired line or halftone subject, the unexposed areas are dissolved away, leaving a resist image on the original support. At this stage, if the resist has been formed on a surface repelling greasy printing inks when moistened, the element can be used directly as a lithographic printing plate. In other cases the support, such as a metal plate, can be etched out in a well-known manner to provide an etched printing plate. Other uses for our resins employing the light-sensitive properties will occur to those skilled in the art. For example, the polymers can be employed to form coatings on any surface or object to which they will adhere and by exposure to light of a layer of the polymer on the object, the coating can be insolubilized.

What I claim is:

1. The method for preparing a solvent-soluble light-sensitive vinyl benzal acetophenone polymer which comprises acylating a polymer of a compound having the general formula

wherein D represents a monocyclic aryl group of the benzene series, by reacting said polymer in carbon disulfide solution in the presence of at least about one-half mol of a cinnamoyl halide per monomeric unit of said compound in the polymer and about 1.1 mol of aluminum chloride per mol of cinnamoyl halide used, the reaction mixture being thoroughly stirred and maintained at about 5 to 15° C., during the course of the reaction.

2. The method for preparing a solvent-soluble light-sensitive vinyl benzal acetophenone polymer which comprises acylating a polymer of a compound having the general formula $$CH_2=CH—D$$

wherein D represents a monocyclic aryl group of the benzene series, by reacting said polymer in carbon disulfide solution in the presence of at least about one-half mol of cinnamoyl chloride per monomeric unit of said compound in the polymer and about 1.1 mol of aluminum chloride per mol of cinnamoyl chloride used, the reaction mixture being thoroughly stirred and maintained at about 5 to 15° C., during the course of the reaction.

3. A method for preparing a solvent-soluble light-sensitive vinyl benzal acetophenone polymer which comprises acylating polystyrene in carbon disulfide solution in the presence of at least about one-half mol of cinnamoyl chloride per monomeric unit of polystyrene and about 1.1 mol of aluminum chloride per mol of cinnamoyl chloride used, the reaction mixture being thoroughly stirred and maintained at a temperature of from 5 to 15° C., during the course of the reaction.

4. A method for preparing a solvent-soluble light-sensitive vinyl benzal acetophenone polymer which comprises acylating polystyrene in carbon disulfide solution in the presence of about one mol of cinnamoyl chloride per monomeric unit of polystyrene and about 1.1 mol of aluminum chloride per mol of cinnamoyl chloride, the reaction mixture being thoroughly stirred and maintained at a temperature of from 5 to 15° C., during the course of the reaction.

5. A method for preparing a solvent-soluble light-sensitive vinyl benzal acetophenone polymer which comprises acylating polystyrene in carbon disulfide solution in the presence of about one-half mol of cinnamoyl chloride per monomeric unit of polystyrene and about 1.1 mol of aluminum chloride per mol of cinnamoyl chloride, the reaction mixture being well stirred and maintained at a temperature of from 5 to 15° C., during the course of the reaction.

References Cited in the file of this patent

UNITED STATES PATENTS 2,566,302    Allen et al. _____ Sept. 4, 1951